United States Patent
Kondo (10) Patent No.: US 10,175,663 B2
(45) Date of Patent: Jan. 8, 2019

(54) PLANT MONITORING CONTROL DEVICE

(71) Applicant: Mitsubishi Electric Corporation, Chiyoda-ku, Tokyo (JP)

(72) Inventor: Seiji Kondo, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/560,566

(22) PCT Filed: Mar. 24, 2015

(86) PCT No.: PCT/JP2015/058820
§ 371 (c)(1),
(2) Date: Sep. 22, 2017

(87) PCT Pub. No.: WO2016/151744
PCT Pub. Date: Sep. 29, 2016

(65) Prior Publication Data
US 2018/0046154 A1    Feb. 15, 2018

(51) Int. Cl.
*G05B 13/04* (2006.01)
*G05B 17/02* (2006.01)
*G05B 23/02* (2006.01)

(52) U.S. Cl.
CPC .......... *G05B 13/048* (2013.01); *G05B 17/02* (2013.01); *G05B 23/02* (2013.01)

(58) Field of Classification Search
CPC ....... G05B 13/048; G05B 17/02; G05B 23/02
See application file for complete search history.

(56) References Cited

U.S. PATENT DOCUMENTS

| 8,890,653 B2 * | 11/2014 | Kawaguchi | G09B 25/02 340/5.6 |
| 2005/0222698 A1 * | 10/2005 | Eryurek | G06F 8/34 700/90 |

(Continued)

FOREIGN PATENT DOCUMENTS

| JP | 2001-290516 A | 10/2001 |
| JP | 2008-171152 A | 7/2008 |
| JP | 2009-223457 A | 10/2009 |

OTHER PUBLICATIONS

International Search Report (PCT/ISA/210) dated Jun. 16, 2015, by the Japanese Patent Office as the International Searching Authority for International Application No. PCT/JP2015/058820.

(Continued)

*Primary Examiner* — Charles R Kasenge
(74) *Attorney, Agent, or Firm* — Buchanan Ingersoll & Rooney PC (57) ABSTRACT

A plant monitoring control device is such that when a control command is input by an operator into a process control device that implements control of a plant, a simulator is notified by a control unit of control information in the control command. Furthermore, whether or not to implement the control is automatically determined by a determination circuit of the control unit based on a result of a predictive operation by the simulator, and when determining to implement, the process control device is notified by the control unit of the control information in the control command.

5 Claims, 8 Drawing Sheets

(56) References Cited

U.S. PATENT DOCUMENTS

| | | | |
|---|---|---|---|
| 2007/0100478 A1* | 5/2007 | Egeland | G05B 19/41865 |
| | | | 700/45 |
| 2007/0129917 A1* | 6/2007 | Blevins | G05B 17/02 |
| | | | 703/6 |
| 2007/0168057 A1* | 7/2007 | Blevins | G05B 13/022 |
| | | | 700/53 |
| 2007/0208549 A1* | 9/2007 | Blevins | G05B 17/02 |
| | | | 703/6 |
| 2008/0168016 A1 | 7/2008 | Sekiai et al. | |
| 2013/0187751 A1* | 7/2013 | Kawaguchi | G09B 25/02 |
| | | | 340/5.6 |

OTHER PUBLICATIONS

Written Opinion (PCT/ISA/237) dated Jun. 16, 2015, by the Japanese Patent Office as the International Searching Authority for International Application No. PCT/JP2015/058820.

* cited by examiner

| PROCESS ID | PROCESS DETAILS | DETERMINATION LOGIC | REMARKS |
|---|---|---|---|
| 1 | XX VALVE OPENING | $0 < x < A \ \& \ B < y$ | |
| 2 | XX VALVE CLOSING | $A+y < x < B+z$ | |
| ⋮ | ⋮ | ⋮ | ⋮ |
| ⋮ | ⋮ | ⋮ | ⋮ |
| ⋮ | ⋮ | ⋮ | ⋮ |
| N−1 | XX MOTOR STARTING | xxx | |
| N | XX MOTOR STOPPING | yyy | |

| PROCESS ID | PROCESS DETAILS | DETERMINATION STANDARD | PREDICTIVE OPERATION ○: NECESSARY ×: UNNECESSARY | REMARKS |
|---|---|---|---|---|
| 1 | XX VALVE OPENING | FLOW >100 | ○ | |
| 2 | XX VALVE CLOSING | | × | |
| ⋯ | ⋯ | ⋯ | ⋯ | ⋯ |
| N-1 | XX MOTOR STARTING | REVOLUTIONS >100 | ○ | |
| N | XX MOTOR STOPPING | REVOLUTIONS <10 | ○ | |

PLANT MONITORING CONTROL DEVICE

TECHNICAL FIELD

The present invention relates to a plant monitoring control device including a simulator that simulates an operation of a process control device that controls a plant.

BACKGROUND ART

A plant monitoring control device acquires plant data, which are various kinds of parameter date indicating a state of a plant, from a process control device that controls the plant. An operator monitors current plant data values, a trend graph showing change tendencies, and the like, on a monitoring screen, and commands the process control device to carry out a necessary control.

However, it may happen that as a result of a process such as, for example, a parameter setting value change or valve opening and closing being implemented in accordance with an operator command, a plant response differs from an expectation of the operator. Because of this, the operator has to carry out control while monitoring plant data change tendencies, and it may happen that an operation takes a long time.

Also, in order to implement an important control that has a large effect, it is necessary that the operator carries out training on a training simulator. Furthermore, when actually operating, the operator's attention is drawn by multiple confirmation buttons, there are a large number of operations, and there is a large burden on the operator.

Therefore, as support for reducing the burden on the operator, a simulator that simulates the plant is used, and a prediction of a change in plant data after implementing a control is carried out. For example, a plant operation support device including a first prediction simulator, which predicts a future plant trend based on changed setting value information when an operator changes a setting value, and a second simulator, which predicts a future plant trend based on setting value information before the change, is disclosed in Patent Document 1.

CITATION LIST

Patent Literature

Patent Document 1: JP-A-2009-223457

SUMMARY OF INVENTION

Technical Problem

The plant operation support device of Patent Document 1 is such that the operator can determine whether or not to carry out a setting value change after considering trend information from two simulation results. However, when there is no clear difference between the simulation results, or when the hoped-for simulation results are not obtained, the decision is left to the operator, because of which there is a burden on the operator.

Also, Patent Document 1 is such that when the operator changes a setting value, simulation of future trends is executed before and after the change, but a setting value change not being the only control command to the plant, there are also, for example, valve opening and closing, motor start-up and stopping, and the like. In Patent Document 1, there is no mention of predicting a result of a control command other than a setting value change.

The invention, taking the heretofore described problems into consideration, has an object of providing a plant monitoring control device that predicts a plant data change after a plant control is implemented, and furthermore, can automatically determine whether or not to implement each control, thereby reducing a burden on an operator.

Solution to Problem

A plant monitoring control device according to the invention is a plant monitoring control device, connected via a network to a process control device that implements control of a plant based on control information, that carries out monitoring control by acquiring plant data, which are various kinds of parameter indicating a state of the plant, from the process control device, the plant monitoring control device including receiving device into which a control command for the process control device is input, a simulator that executes a control program that simulates an operation of the process control device and carries out an operation predicting plant data after a control based on the control command is implemented, a plant model, having a database in which are accumulated plant data acquired from the process control device, that supplies plant data necessary when executing the control program to the simulator, a determination unit that acquires predicted plant data that are a result of a predictive operation by the simulator, and determines whether or not to implement a control based on the control command, and a processing circuitry to have a predictive operation necessity determination table in which is provided a standard for determining a necessity of a predictive operation by the simulator for each control process ID of the plant, to refer to the process ID in the predictive operation necessity determination table corresponding to control information in the control command with respect to a control command input into the receiving device, to acquire plant data necessary for a determination from the process control device, to determine whether or not the control command is a control command for which a predictive operation by the simulator is necessary, to notify the process control device of the control information in the control command when determining that no predictive operation is necessary with respect to the control command input into the receiving device, to notify the simulator of the control information in the control command and to request a predictive operation when determining that a predictive operation is necessary, and to notify the process control device of the control information in the control command when the determination unit determines that a control based on the control command is to be implemented.

Advantageous Effects of Invention

According to the plant monitoring control device according to the invention, when a control command is input into a process control device by an operator, a processing circuitry determines whether or not the control command is a control command for which a predictive operation by a simulator is necessary, and when determining that a predictive operation is necessary, the simulator is notified of control information in the control command. Furthermore, whether or not to implement a control is automatically determined based on a result of a predictive operation by the simulator, and when determining to implement, the process control device is notified of the control information in the control command. Therefore, the operator carries out no operation other than inputting a control command, an appropriate control can be promptly implemented, and a burden on the operator is reduced.

Objects, characteristics, aspects, and advantages of the invention other than those heretofore described will be further clarified by the following detailed description of the invention, with reference to the drawings.

DESCRIPTION OF EMBODIMENTS

First Embodiment

Figure 1:
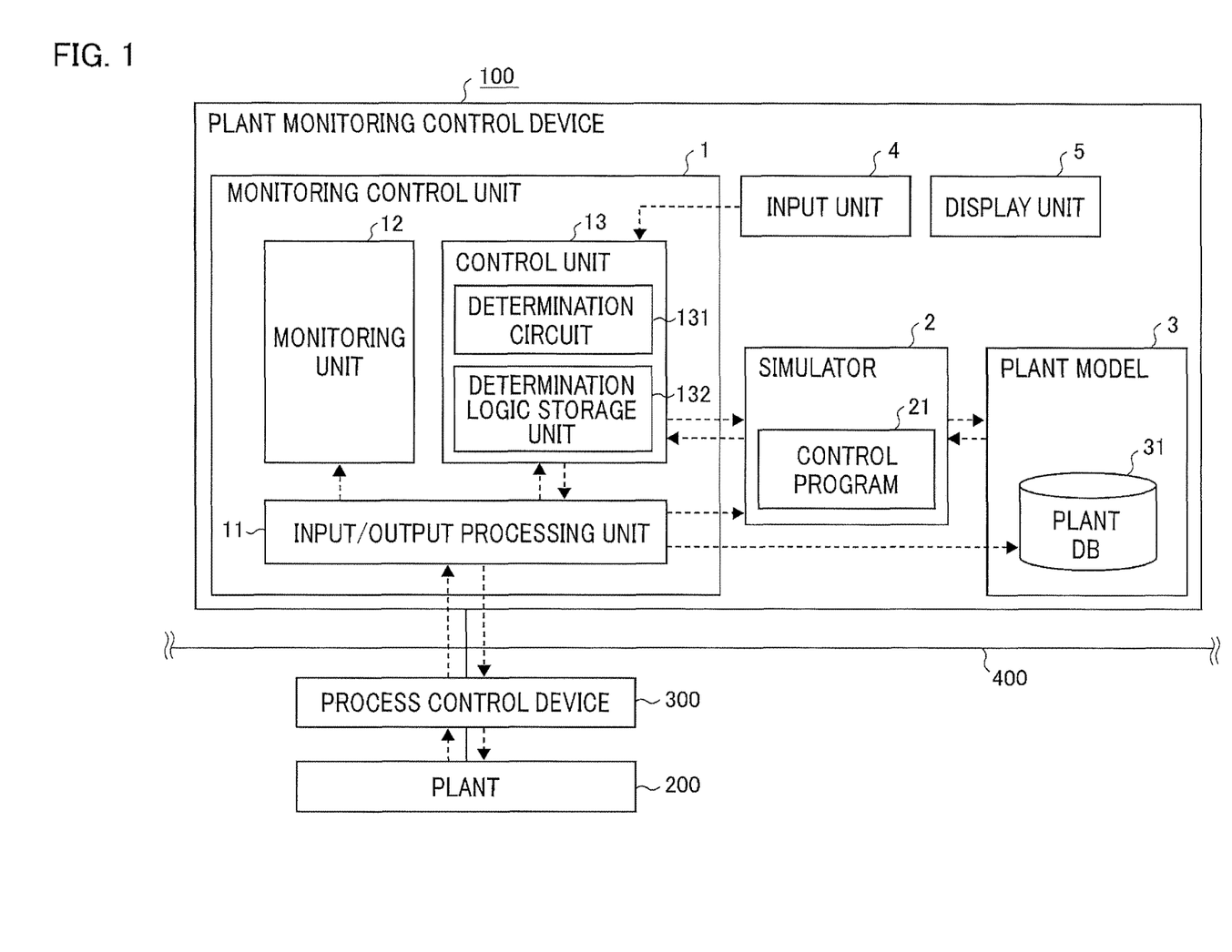
FIG. 1 is a functional block diagram of a plant monitoring control device according to a first embodiment of the invention.
Figure 2:
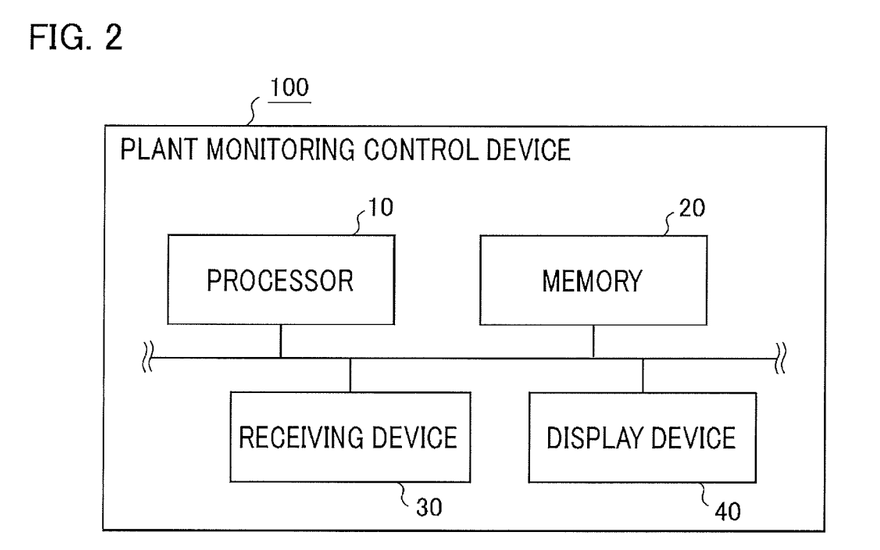
FIG. 2 is a hardware configuration diagram of the plant monitoring control device according to the first embodiment of the invention.

Hereafter, based on the drawings, a plant monitoring control device according to a first embodiment of the invention will be described. FIG. 1 and FIG. 2 are a functional block diagram and hardware configuration diagram of a plant monitoring control device according to the first embodiment. A plant monitoring control device 100 functionally includes a monitoring control unit 1, simulator 2, plant model 3, input unit 4, and display unit 5. Also, the plant monitoring control device 100 includes as hardware a processor 10, memory 20, receiving device 30, and display device 40.

The plant monitoring control device 100 according to the first embodiment is connected via a control network 400 to a process control device 300 that implements a control of a plant 200 based on control information. The plant 200 includes various kinds of equipment, for example, a motor, pump, valve, switch, hydraulic device, and the like, that configure a plant.

Functions of the monitoring control unit 1, simulator 2, and plant model 3 are realized by the processor 10 executing a program stored in the memory 20. Also, the aforementioned functions may be executed by a multiple of the processor 10 and a multiple of the memory 20 in coordination. The input unit 4 is the receiving device 30, which receives information input by an operator using a mouse, keyboard, touch panel, or the like (all omitted from the drawings). The display unit 5 is the display device 40, which is a liquid crystal display or the like.

A monitoring unit 12 and control unit 13 of the monitoring control unit 1 carry out an exchange of control information and plant data with the process control device 300 via an input/output processing unit 11. The monitoring unit 12 acquires plant data, which are various kinds of parameter indicating a state of the plant 200, from the process control device 300, and monitors current values and change tendencies of the plant data.

The control unit 13 notifies the simulator 2 or process control device 300 of control information in a control command input into the input unit 4 by the operator. When the control unit 13 requests the simulator 2 to carry out a predictive operation, the control unit 13 notifies the simulator 2 of the control information before notifying the process control device 300 of the control information. In the first embodiment, when the control command is input into the input unit 4, the control unit 13 requests the simulator 2 to carry out a predictive operation regardless of the control process details.

The simulator 2 has a control program 21 that simulates an operation of the process control device 300, and the simulator 2 receives a predictive operation request from the control unit 13, executes the control program 21, and carries out an operation predicting a change in plant data after a control based on a control command by the operator is implemented. Predicted plant data output as a result of a predictive operation not being limited to one value, there are also cases in which a plant data transition in accordance with an elapse of time, or the like, is output.

Also, when there is no predictive operation request from the control unit 13, the simulator 2 acquires actual plant data from the process control device 300 via the input/output processing unit 11 of the monitoring control unit 1, executes the control program 21 using the plant data, and notifies the plant model 3 of the predicted plant data obtained.

The plant model 3 has a plant database 31 (hereafter referred to as the plant DB 31) that accumulates actual plant data acquired from the process control device 300. The plant model 3 acquires control information of an implemented control, and plant data including plant data before and after the control, in chronological order via the input/output processing unit 11 of the monitoring control unit 1, and stores the control information and plant data in the plant DB 31.

The plant model 3, using the plant data accumulated in the plant DB 31, generates plant data (calculated values) necessary when the simulator 2 executes the control program 21, and supplies the plant data to the simulator 2.

Figure 3:
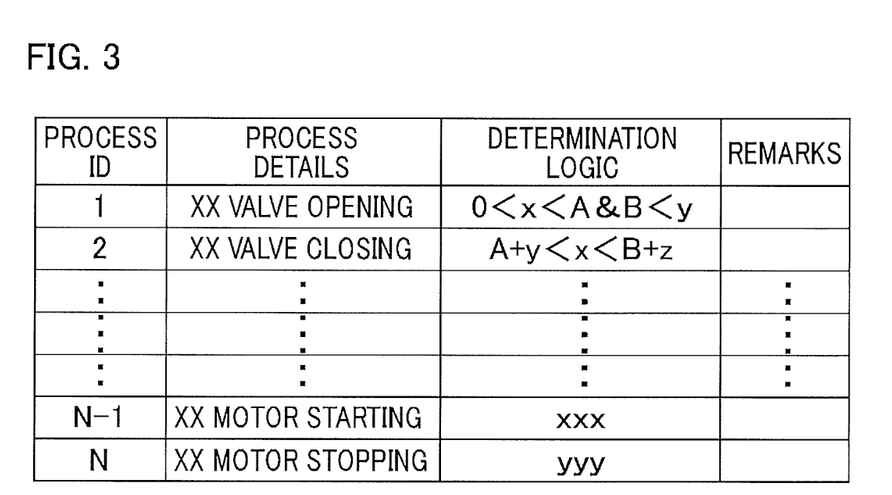
FIG. 3 is a diagram showing a determination logic table in the plant monitoring control device according to the first embodiment of the invention.

For example, when a predictive operation requested of the simulator 2 is an operation predicting flow owing to an "XX valve opening" of process ID 1 shown in FIG. 3, the plant model 3 extracts plant data (flow data in this case) for past implementations of the same process ID 1 from the plant DB 31, chooses necessary data from among those plant data, and supplies the data to the simulator 2. When the necessary data are not stored in the plant DB 31, the plant model 3 supplies the simulator 2 with a calculation value estimated from preceding and subsequent plant data.

Furthermore, the plant model 3 has a function of acquiring predicted plant data, which are a result of a predictive operation by the simulator 2, and actual plant data corresponding to the predicted plant data after a control is implemented, and comparing the two. When the deviation between the predicted plant data and actual plant data is large, and there is a gap of a predetermined value or greater, the plant data supplied to the simulator 2 is corrected, and the plant DB 31 is updated.

As a predictive operation by the simulator 2 is carried out using plant data (calculated values) based on past plant data accumulated in the plant DB 31, the accuracy of the predictive operation depends on the accuracy of the plant data (calculated values) supplied from the plant model 3. In other words, when there is a large discrepancy between the plant data predicted by the simulator 2 and the actual plant data, there is a possibility that the cause is in the plant data used in the predictive operation. Because of this, the accuracy of a predictive operation by the simulator 2 can be kept high by the plant model 3 updating the contents of the plant DB 31.

Furthermore, the control unit 13 includes a determination circuit 131 and determination logic storage unit 132 as a determination unit that determines whether or not to implement a control based on a control command from the operator. The determination logic storage unit 132 stores determination logic set with respect to the process details of each control. The determination circuit 131 determines whether or not to implement the current control based on the predicted plant data acquired from the simulator 2 and the determination logic stored in the determination logic storage unit 132.

FIG. 3 shows an example of a determination logic table stored in the determination logic storage unit 132. Determination conditions for predicted plant data x, y, and z are set for each control process ID in the determination logic table. In FIGS. 3, A and B are constants set in advance. When the predicted plant data x, y, and z satisfy the determination logic, the determination circuit 131 determines that the relevant control is to be implemented.

Figure 4:
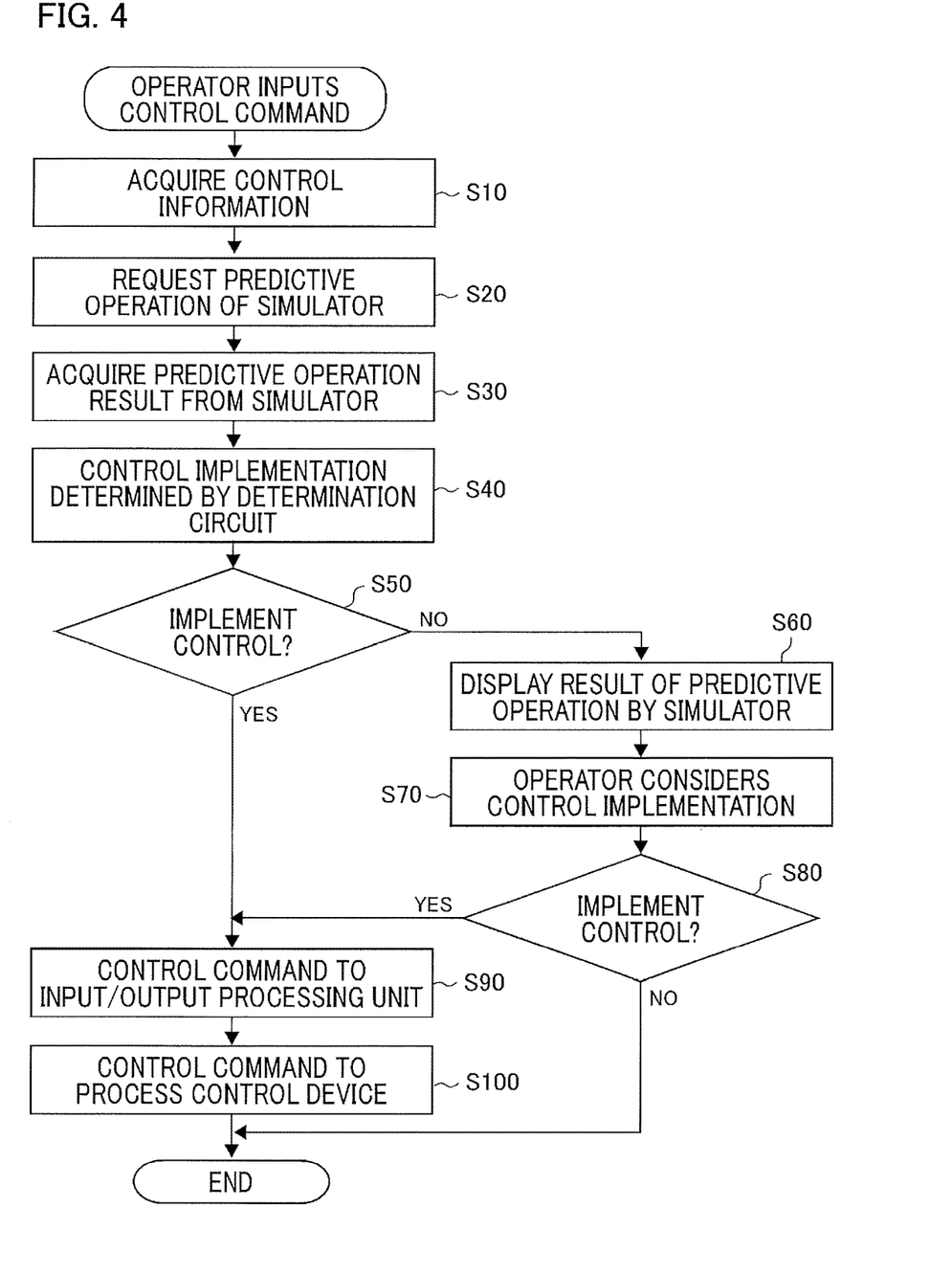
FIG. 4 is a diagram showing a flow of a process carried out by a monitoring control unit of the plant monitoring control device according to the first embodiment of the invention.

A description will be given, using a flowchart of FIG. 4, of a flow of a process carried out by the monitoring control unit 1 when the operator inputs a control command into the input unit 4 in the plant monitoring control device 100 according to the first embodiment. A process carried out by the operator is also included in the flowchart of FIG. 4 (step 70).

When the operator inputs a control command into the input unit 4, the control unit 13 of the monitoring control unit 1 acquires control information from the input control command in step 10 (S10). Continuing, in step 20 (S20), the control unit 13 notifies the simulator 2 of the acquired control information, and requests a predictive operation of the simulator 2.

The simulator 2, on receiving the predictive operation request, executes the control program 21 using the control information notified of by the control unit 13 and the plant data (calculated values) acquired from the plant model 3. A flow of a process carried out by the simulator 2 will be described hereafter using a flowchart of FIG. 5.

In step 30 (S30), the control unit 13 acquires a predictive operation result from the simulator 2. Continuing, in step 40 (S40), the control unit 13 notifies the determination circuit 131 of the predictive operation result, and whether or not to implement the current control is determined in the determination circuit 131.

When the determination circuit 131 determines in step 50 (S50) to implement the current control (YES), the process proceeds to step 90 (S90), and the control unit 13 notifies the input/output processing unit 11 of the control information in the current control command, and commands the control. Furthermore, in step 100 (S100), the input/output processing unit 11 notifies the process control device 300 of the control information in the current control command, and commands the control.

Meanwhile, when the determination circuit 131 determines in step 50 not to implement the current control (NO), the process proceeds to step 60 (S60), and the control unit 13 displays the result of the predictive operation by the simulator 2 and the result of the determination by the determination circuit 131 in the display unit 5. Continuing, in step 70 (S70), the operator refers to the result of the predictive operation by the simulator 2 displayed in the display unit 5, and considers whether to implement the current control.

When the operator determines in step 80 (S80) to implement the current control (YES), the control unit executes the processes of S90 and S100. Also, when the operator determines in step 80 not to implement the current control (NO), the process is ended.

Figure 5:
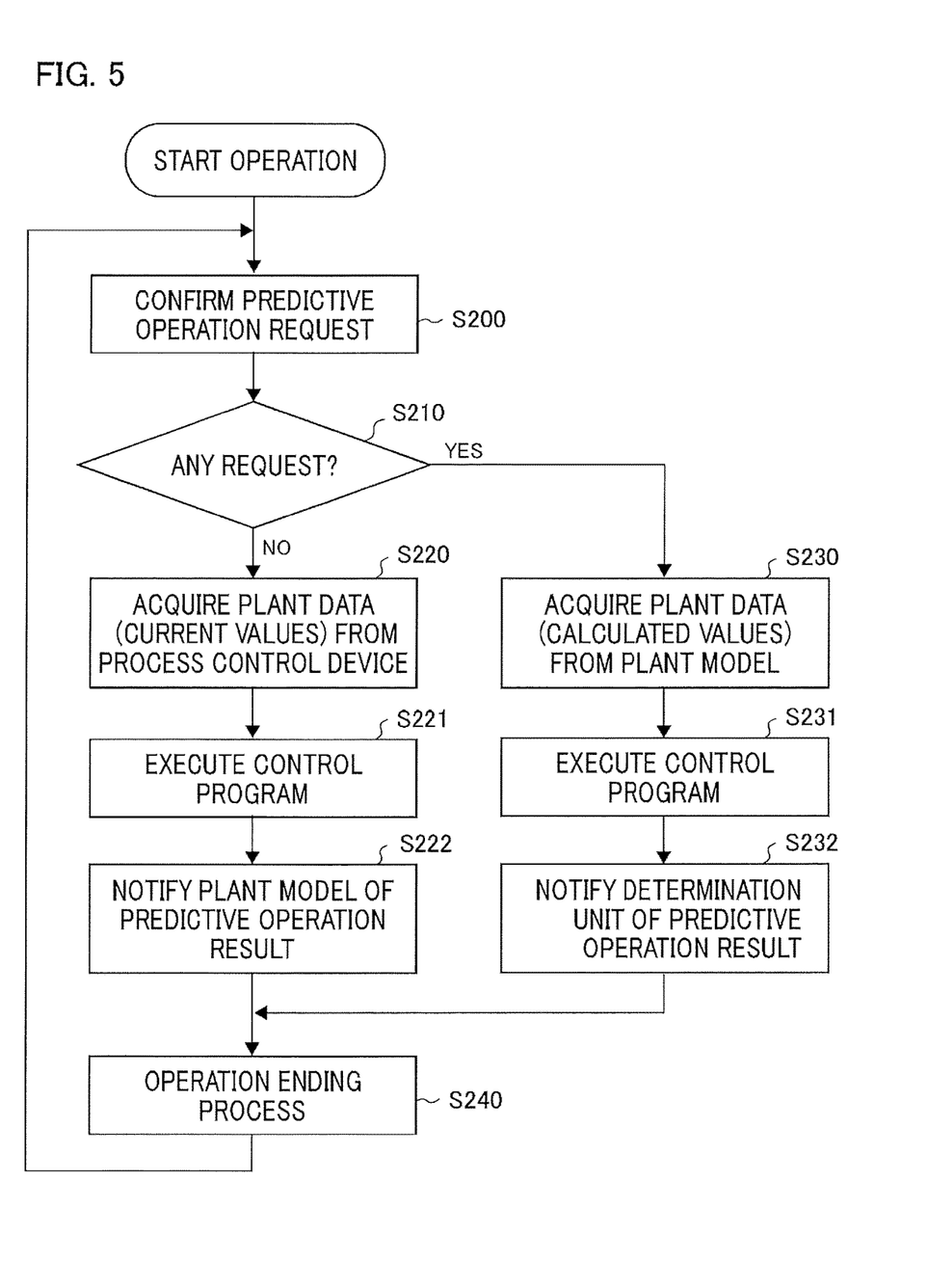
FIG. 5 is a diagram showing a flow of a process carried out by a simulator of the plant monitoring control device according to the first embodiment of the invention.

Next, a flow of a process carried out by the simulator 2 will be described using the flowchart of FIG. 5. The simulator 2 executes an operation every fixed cycle (for example, 50 mec to 500 msec). When starting an operation, firstly, the simulator 2 confirms in step 200 (S200) whether or not there is a predictive operation request from the control unit 13. The existence or otherwise of a predictive operation request is determined by the existence or otherwise of a notification of control information.

When there is no predictive operation request in step 210 (S210) (NO), the process proceeds to step 220 (S220), and the simulator 2 acquires actual plant data (current values) from the process control device 300. Continuing, in step 221 (S221), the simulator 2 executes the control program 21 using the actual plant data acquired in S220. Furthermore, in step 222 (S222), the simulator 2 notifies the plant model 3 of a predictive operation result, and carries out an operation ending process in step 240 (S240).

Meanwhile, when there is a predictive operation request in step 210 (YES), the process proceeds to step 230 (S230), and the simulator 2 acquires plant data (calculated values) from the plant model 3. Continuing, in step 231 (S231), the simulator 2 executes the control program 21 using the plant data (calculated values) acquired in S230. Furthermore, in step 232 (S232), the simulator 2 notifies the determination circuit 131 of a predictive operation result, and carries out the operation ending process in S240.

According to the plant monitoring control device 100 according to the first embodiment, when a control command is input by the operator into the process control device 300 that implements control of the plant 200, the simulator 2 is notified of control information in the control command by the control unit 13. Furthermore, whether or not to implement the control is automatically determined by the determination circuit 131 of the control unit 13 based on a result of a predictive operation by the simulator 2, and when determining to implement, the process control device 300 is notified of the control information in the control command by the control unit 13.

Therefore, the operator carries out no operation other than inputting a control command into the input unit 4, and does not determine by him or herself whether or not to implement the control based on a predictive operation result, because of which an appropriate control whose result is predicted in advance by the simulator 2 can be promptly implemented, and a burden on the operator is reduced.

Second Embodiment

In the first embodiment, when a control command from the operator is input into the input unit 4, a predictive operation by the simulator 2 is carried out regardless of the control process details. Among command controls, however, there are also simple processes that do not need a predictive operation.

Therefore, in a second embodiment of the invention, a predictive operation is carried out only for a control command with process details such that a predictive operation by a simulator is necessary. As an overall configuration of the plant monitoring control device 100 according to the second embodiment is the same as in the first embodiment, FIG. 1 will be utilized, and a description of each portion omitted.

Figure 6:
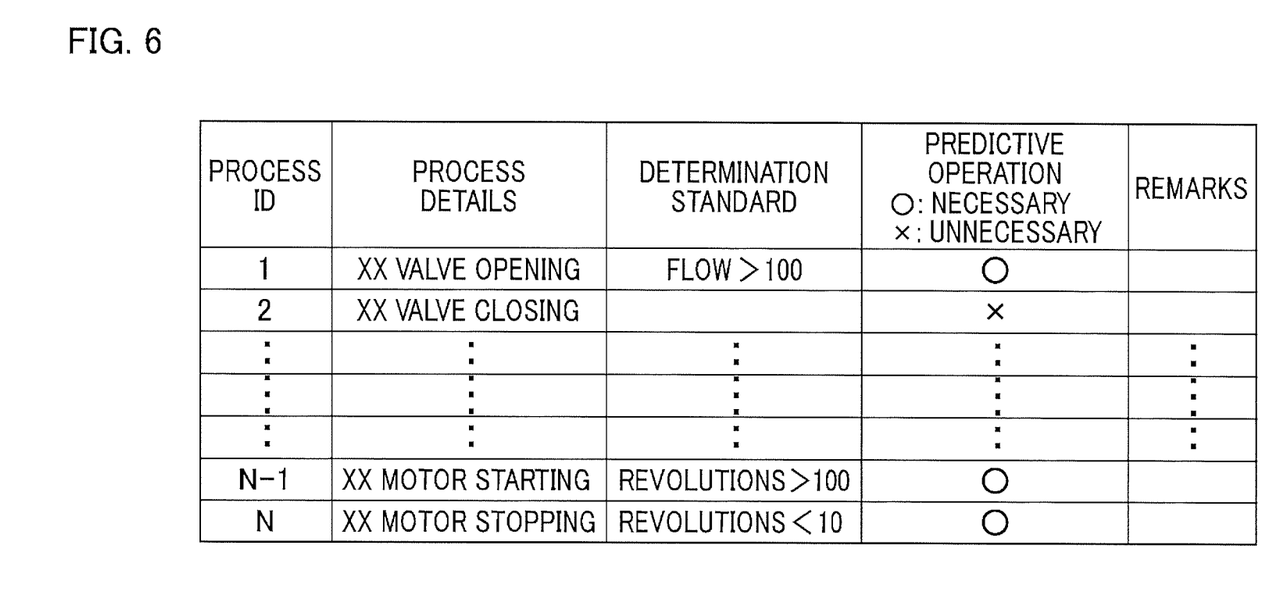
FIG. 6 is a diagram showing a predictive operation necessity determination table in a plant monitoring control device according to a second embodiment of the invention.

The control unit 13 of the plant monitoring control device 100 according to the second embodiment has a predictive operation necessity determination table shown in FIG. 6, and determines whether or not a control command input into the input unit 4 is a control command such that a predictive operation by the simulator 2 is necessary.

In the example shown in FIG. 6, a determination standard is provided for each control process ID in the predictive operation necessity determination table. For example, in the case of an "XX valve opening" of a process ID 1, the control unit 13 determines that a predictive operation is necessary when a flow exceeds 100 (liters/minute). Also, in the case of an "XX valve closing" of a process ID 2, the control unit 13 determines that no predictive operation is necessary, regardless of the flow.

Figure 7:
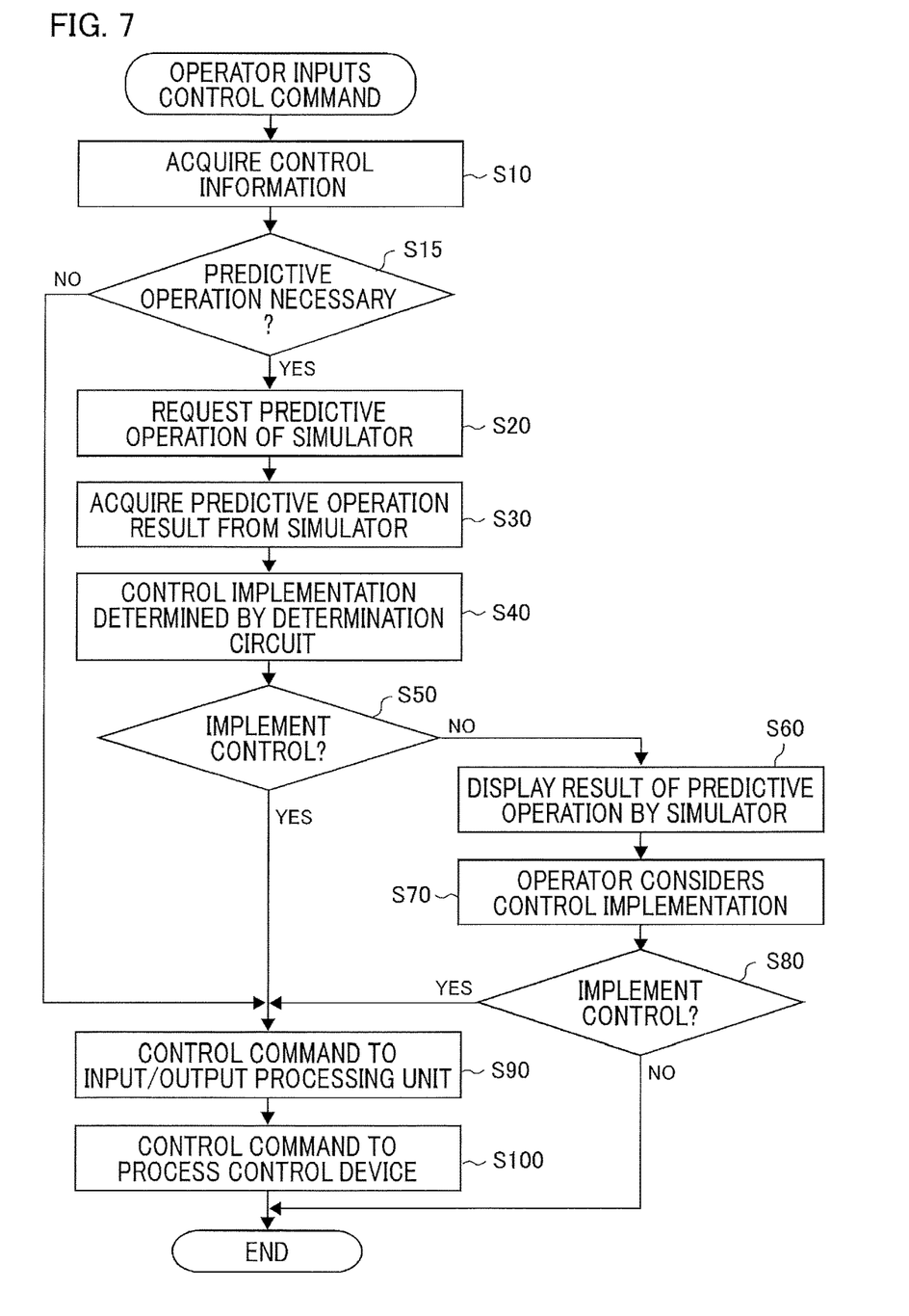
FIG. 7 is a diagram showing a flow of a process carried out by a monitoring control unit of the plant monitoring control device according to the second embodiment of the invention.

A description will be given, using a flowchart of FIG. 7, of a flow of a process carried out by the monitoring control unit 1 when the operator inputs a control command into the input unit 4 in the plant monitoring control device 100 according to the second embodiment. A process carried out by the operator is also included in the flowchart of FIG. 7 (step 70).

When the operator inputs a control command into the input unit 4, the control unit 13 of the monitoring control unit 1 acquires control information from the input control command in S10, and determines in step 15 (S15) whether or not the current control command is a control command such that a predictive operation by the simulator 2 is necessary. Specifically, the control unit 13 refers to the process ID corresponding to the control information acquired in S10 in the predictive operation necessity determination table (FIG. 6), acquires the plant data necessary for the determination from the process control device 300, and carries out the determination.

When the control unit 13 determines in S15 that a predictive operation is necessary (YES), the process proceeds to S20, and the control unit 13 notifies the simulator 2 of the control information in the current control command, and requests a predictive operation. Meanwhile, when the control unit 13 determines in S15 that no predictive operation is necessary (NO), the process proceeds to S90, and the control unit 13 notifies the input/output processing unit 11 of the control information in the current control command, and commands the control.

Furthermore, in S100, the input/output processing unit 11 notifies the process control device 300 of the control information in the current control command, and commands the control. As the processes of S30 to S80 are the same processes as in the flowchart of FIG. 4 described in the first embodiment, a description thereof will be omitted.

According to the second embodiment, in addition to the same advantages as in the first embodiment, a control command for which it is determined that no predictive operation is necessary is such that the process control device 300 is notified directly of the control information without a predictive operation being carried out by the simulator 2, because of which a simple control can be implemented promptly, and the burden on the operator is reduced.

Third Embodiment

In the first embodiment, the determination circuit 131 and determination logic storage unit 132 for determining whether or not to implement the current control are provided in the control unit 13, but in a third embodiment of the invention, a determination unit is provided together with determination logic as one portion of the control program 21 executed by the simulator 2. As an overall configuration of the plant monitoring control device 100 according to the third embodiment is the same as in the first embodiment, FIG. 1 will be utilized, and a description of each portion omitted.

Figure 8:
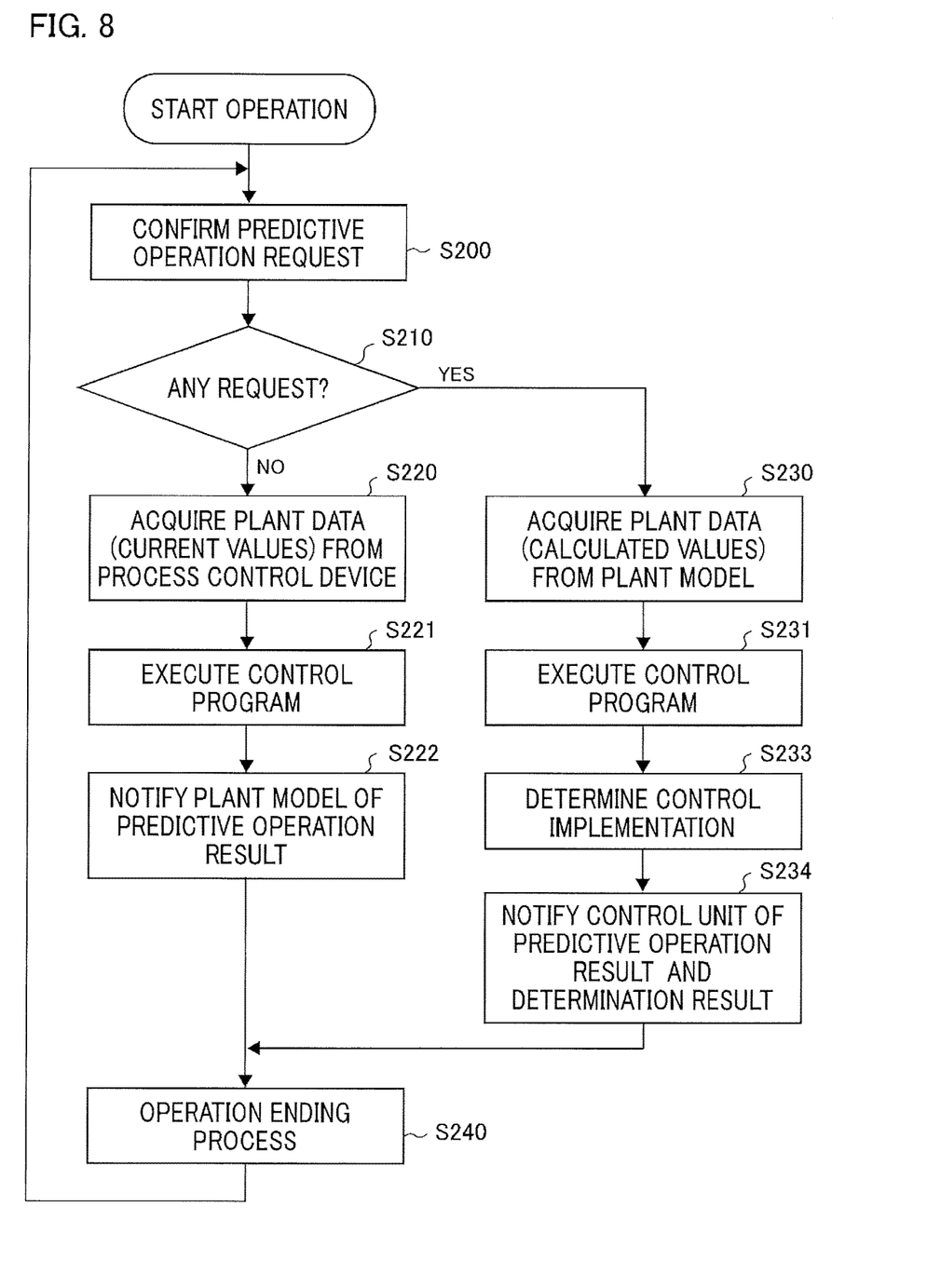
FIG. 8 is a diagram showing a flow of a process carried out by a simulator of a plant monitoring control device according to a third embodiment of the invention.

FIG. 8 is a flowchart showing a flow of a process carried out by the simulator 2 in the third embodiment. In FIG. 8, the processes of S200 to S231 are the same processes as in the flowchart of FIG. 5 described in the first embodiment, because of which a description thereof will be omitted.

In S231, the simulator 2 executes the control program 21 using the plant data (calculated values) acquired in S230, and carries out a predictive operation. Continuing, in step 233 (S233), the simulator 2 determines in the control program 21, based on a result of the predictive operation, whether or not to implement the current control. Subsequently, in step 234 (S234), the simulator 2 notifies the control unit 13 of the result of the predictive operation and the determination result, and carries out an operation ending process in S240.

In this way, in the third embodiment, the control unit 13 acquires a result of a predictive operation and a result of determining whether or not to implement the current control from the simulator 2. When the simulator 2 determines to implement the current control, the control unit 13 notifies the process control device 300 of the control information in the current control command, and the process control device 300 implements a control based on the current control command.

Meanwhile, when the simulator 2 determines not to implement the current control, the control unit 13 displays a result of a predictive operation by the simulator 2 and the determination result in the display unit 5, and the operator refers to the result of the predictive operation by the simulator 2 displayed in the display unit 5, and considers whether to implement the current control.

According to the third embodiment, in addition to the same advantages as in the first embodiment, determination logic can be programmed by a determination unit being one portion of the control program 21 of the simulator 2, whereby more complex determination logic can be set.

Fourth Embodiment

In the first embodiment to third embodiment, when a determination unit determines from a result of a predictive operation by the simulator 2 not to implement the current control, the operator has to refer to the result of the predictive operation by the simulator 2 displayed in the display unit 5, consider whether to implement the current control, and command the next control.

Therefore, in a fourth embodiment of the invention, there is an additional function that presents the operator with operational guidance relating to the next control when a determination unit determines not to implement the current control. As an overall configuration of the plant monitoring control device 100 according to the fourth embodiment is the same as in the first embodiment, FIG. 1 will be utilized, and a description of each portion omitted. Also, in the fourth embodiment, the determination unit is provided as one portion of the control program 21 of the simulator 2, in the same way as in the third embodiment.

By a certain control being implemented with respect to the plant 200, there is an expected change in a plant state (plant data) (this is referred to as an expected advantage). For example, when the "XX valve opening" of process ID 1 shown in FIG. 6 is implemented, a change in the plant data, that being an xx level rise or an xx flow increase, is expected at a normal time. At an abnormal time, however, there are cases in which the expected advantage is not obtained even though the control is implemented, and also cases in which the control itself cannot be implemented.

When it is predicted as a result of a predictive operation by the simulator 2 that the expected advantage will not be obtained, and the determination unit determines not to implement the current control, the operator needs to command another control in place of the current control. The monitoring unit 12 in the fourth embodiment has an operational guidance storage unit and operational guidance search means (both omitted from the drawing), and the operator can issue the next control command by referring to operational guidance displayed in the display unit 5.

Operational guidance is stored in the operational guidance storage unit. Operational guidance is configured to include each control process ID, process details, the expected advantage of the process, a substitute process, and the like. For example, when the expected advantage when implementing the "XX valve opening" of process ID 1 is an "xx flow increase", a "YY valve opening" is registered as a substitute process for obtaining the "xx flow increase". The operational guidance search means searches for operational guidance based on the current control process ID, and extracts a substitute process.

Figure 9:
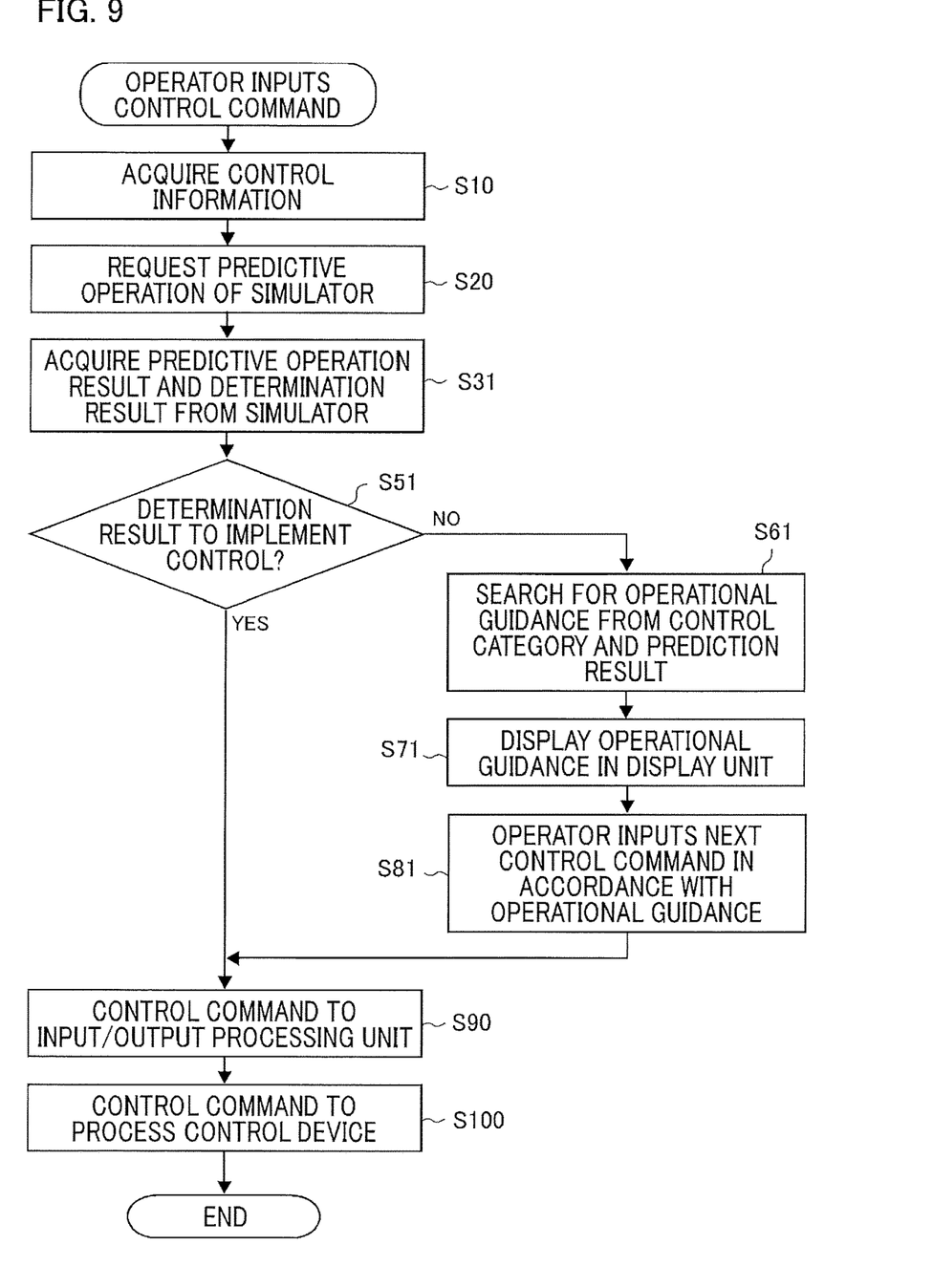
FIG. 9 is a diagram showing a flow of a process carried out by a monitoring control unit of a plant monitoring control device according to a fourth embodiment of the invention.

A description will be given, using a flowchart of FIG. 9, of a flow of a process carried out by the monitoring control unit 1 when the operator inputs a control command into the input unit 4 in the plant monitoring control device 100 according to the fourth embodiment. In FIG. 9, the processes of S10, S20, S90, and S100 are the same processes as in the flowchart of FIG. 4 described in the first embodiment. A process carried out by the operator is also included in the flowchart of FIG. 9 (step 81).

When the operator inputs a control command into the input unit 4, the control unit 13 acquires control information from the input control command in S10. Continuing, in S20, the control unit 13 notifies the simulator 2 of the acquired control information, and requests a predictive operation of the simulator 2. The simulator 2, on receiving the predictive operation request, executes the control program 21 using the control information notified of by the control unit 13 and the plant data (calculated values) acquired from the plant model 3, and determines whether or not to implement the current control based on a result of the predictive operation.

Continuing, in step 31 (S31), the control unit 13 acquires the predictive operation result and determination result from the simulator 2. When the determination result in step S1 (S51) is that the current control is to be implemented (YES), the process proceeds to S90, the control unit 13 commands the input/output processing unit 11 to implement the current control, and furthermore, in S100, the input/output processing unit 11 commands the process control device 300 to implement the current control.

Meanwhile, when the determination result in S51 is that the current control is not to be implemented (NO), the operational guidance search unit of the monitoring unit 12 searches for operational guidance from the category (process ID) of the current control and the predictive operation result in step 61 (S61), and displays the operational guidance in the display unit 5 in step 71 (S71). Continuing, in step 81 (S81), the operator inputs the next control command into the input unit 4 in accordance with the operational guidance, and the processes of S90 and S100 are carried out.

According to the fourth embodiment, in addition to the same advantages as in the first embodiment and third embodiment, the operator is presented with operational guidance relating to the next control when the determination unit determines not to implement the current control, because of which the burden on the operator is further reduced, and an appropriate control can also be implemented promptly at an abnormal time in the plant 200. The embodiments can be freely combined, and each embodiment can be modified or abbreviated as appropriate, without departing from the scope of the invention.

The invention claimed is:

1. A plant monitoring control device, connected via a network to a process control device that implements control of a plant based on control information, that carries out monitoring control by acquiring plant data, which are various kinds of parameter indicating a state of the plant, from the process control device, the plant monitoring control device comprising:

a receiving device into which a control command for the process control device is input;

a simulator that executes a control program that simulates an operation of the process control device and carries out an operation predicting plant data after a control based on the control command is implemented;

a plant model, having a database in which are accumulated plant data acquired from the process control device, that supplies plant data necessary when executing the control program to the simulator;

a determination unit that acquires predicted plant data that are a result of a predictive operation by the simulator, and determines whether or not to implement a control based on the control command; and a processing circuitry to have a predictive operation necessity determination table in which is provided a standard for determining a necessity of a predictive operation by the simulator for each control process ID of the plant, to refer to the process ID in the predictive operation necessity determination table corresponding to control information in the control command with respect to a control command input into the receiving device, to acquire plant data necessary for a determination from the process control device, to determine whether or not the control command is a control command for which a predictive operation by the simulator is necessary, to notify the process control device of the control information in the control command when determining that no predictive operation is necessary with respect to the control command input into the receiving device, to notify the simulator of the control information in the control command and to request a predictive operation when determining that a predictive operation is necessary, and to notify the process control device of the control information in the control command when the determination unit determines that a control based on the control command is to be implemented.

2. The plant monitoring control device according to claim 1, wherein the plant model acquires predicted plant data that are a result of a predictive operation by the simulator and actual plant data corresponding to the predicted plant data, compares the two, and when a gap between the two is equal to or greater than a predetermined value, corrects plant data supplied to the simulator, thereby updating the database.

3. The plant monitoring control device according to claim 1, wherein the determination unit includes a determination logic storage, in which is stored determination logic set with respect to process details of each control, and a determination circuit that carries out a determination based on the determination logic.

4. The plant monitoring control device according to claim 1, wherein the determination unit is provided together with the determination logic as one portion of the control program executed by the simulator.

5. The plant monitoring control device according to claim 1, comprising:

an operational guidance storage in which are stored process details of each control, an expected advantage of the process, and a substitute process for obtaining the expected advantage;

a display device that displays operational guidance, a processor to search the operational guidance storage unit based on the process details of a current control and to extract a substitute process when the determination unit determines not to implement a control based on a current control command, and to display the substitute process in the display device as operational guidance.

\* \* \* \* \*